United States Patent Office 3,565,901

Patented Feb. 23, 1971

1

3,565,901

CERTAIN SALTS OF 1,3,4-THIADIAZOL-2-YLUREAS

Tony Cebalo, Allentown, Pa., assignor to Air Products and Chemicals, Inc., Philadelphia, Pa., a corporation of Delaware No Drawing. Filed Jan. 29, 1969, Ser. No. 795,084

Int. Cl. C07d *91/62*

U.S. Cl. 260—293.4 9 Claims

ABSTRACT OF THE DISCLOSURE

Various novel metal, amine and ammonium derivatives of certain thiadiazol-2-ylureas are disclosed having highly desirable utility as agricultural chemicals, and particularly as phytotoxicants.

BACKGROUND OF THE INVENTION

Field of invention

This invention pertains to the synthesis of novel metal, amine and ammonium derivatives of certain 5-substituted-1,3,4-thiadiazolylureas having useful applications as agricultural chemicals. Furthermore, it pertains to methods for use of such compounds in various agricultural applications.

SUMMARY OF THE INVENTION

The invention pertains to derivatives of 5-substituted-1,3,4-thiadiazol-2-ylureas which have utility as agricultural chemicals. These derivatives may be represented most broadly as having the structure

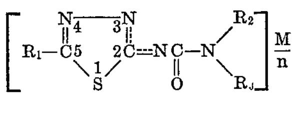

where $R_1$ is a substituent selected from the group consisting of $C_1$ to $C_4$ acyclic hydrocarbon radicals and halogenated derivatives of said radicals wherein each halogen is independently selected from the group consisting of fluorine, chlorine and bromine; $R_2$ is a $C_1$ to $C_4$ acyclic hydrocarbon radical, $R_3$ is a substituent selected from the group consisting of hydrogen and $C_1$ to $C_4$ acyclic hydrocarbon radicals; M is selected from the group comprising metals, ammonium and substituted ammonium and *n* is an integer corresponding to the equivalence of M.

Accordingly, it is an object of the invention to provide new and useful derivatives of the thiadiazol-2-ylureas described above.

A further object of the invention is to provide methods for the effective use of various of these thiadiazol-2-ylurea derivatives in agricultural applications.

2

These and other objects will be apparent to those skilled in the art from a consideration of the description which follows.

PREFERRED EMBODIMENT OF THE INVENTION

(1) Synthesis

This invention relates to the synthesis of novel metal, or unsubstituted and substituted ammonium derivatives of 5-substituted-1,3,4-thiadiazol-2-ylureas, to the compounds themselves and to methods for their effective use in agriculture.

The specific 5-alkyl and haloalkyl-thiadiazol-2-ylureas and their tautomers, which are the precursors of the compounds of the invention, may be represented broadly as having the generic structure:

[I]

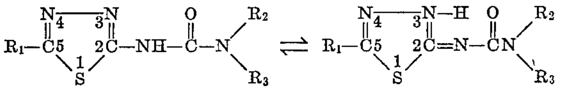

wherein $R_1$ is a substituent selected from the group consisting of $C_1$ to $C_4$ acyclic hydrocarbon radicals in which and halogenated hydrocarbon derivatives of said radicals each halogen is independently selected from the group consisting of fluorine, chlorine, and bromine; wherein $R_2$ is an acyclic $C_1$ to $C_4$ hydrocarbon radical; $R_3$ is a substituent selected from the group consisting of hydrogen and acyclic $C_1$ to $C_4$ hydrocarbon radicals. Henceforth herein the substituents $R_1$, $R_2$, and $R_3$ will have the meaning set forth above.

The desired metal, ammonia and amine derivatives may then be considered as having the generic structure:

[II]

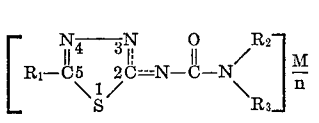

wherein $R_1$, $R_2$, and $R_3$ are as defined above, where M is a metal, or an ammonium radical (unsubstituted or substituted) and where *n* is an integer equal to a valance of M (when a metal) or the acid equivalence of M (when an unsubstituted or substituted ammonium radical).

It should be noted that for the monovalent alkali metals and for ammonia and amines, their thiadiazolylurea derivatives are salt-like in character and highly water soluble making them highly desirable in herbicidal applications. For the polyvalent metals, the thiadiazolylurea derivatives may be salt-like or they may assume chelate characteristics due to the close proximity of the carbonyl group to the nitrogen in the 3-position of the ring.

In typical reactions the 5-substituted thiadiazol-2-ylurea moiety, shown above encompassed within the brackets, is considered to have a reaction equivalence of one, such that, when the compound is reacted with a monovalent metal compound, the ratio of reactants is one-to-one. When the 5-substituted thiadiazol-2-ylurea compound is reacted with a polyvalent metal compound, the integer "*n*" in the formula above may then have a value of from one to the total valence of the metal.

The 5-substituted 1,3,4-thiadiazol-2-ylureas of Formula I used as starting materials for the synthesis of compounds having structure [II] were prepared according to the methods fully disclosed in copending application Ser. No. 712,585 filed Mar. 13, 1968, now abandoned, of which the following are examples:

EXAMPLE 1

To a vigorously stirred solution of 10.5 grams (0.062 mole) of 2-amino-5-trifluoromethyl-1,3,4-thiadiazole dissolved in freshly distilled tetrahydrofuran (distilled from lithium aluminum hydride) and cooled to 0° C., 60 ml. of a 1.2 M solution of n-butyl lithium dissolved in n-hexane was added dropwise. After complete addition of the butyl lithium the reaction mixture was refluxed for two hours, cooled again to 0° C., and 1,1-dimethyl-carbamoyl chloride (6.7 grams, 0.063 mole) was added dropwise. The reaction mixture was then stirred for a prolonged period at room temperature, refluxed for three hours, cooled and washed with a saturated aqueous ammonium sulfate solution. The organic layer was dried with anhydrous sodium sulfate and then concentrated to a gum, which was then dissolved in methanol. Addition of a little water to the methanol yielded a quantity of oil which was removed by filtration through a Celite pad. Addition of more water to the filtrate gave a solid product which, after recrystallization from aqueous methanol was identified as 1,1-dimethyl-3-(5-trifluoromethyl - 1,3,4 - thiadiazol-2-yl) urea.

Other examples illustrative of representative thiadiazol-2-ylurea intermediates of the invention are presented in Table I, where $R_1$, $R_2$, and $R_3$ are as defined above:

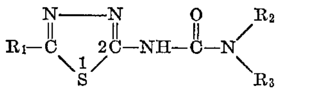

TABLE I

| $R_1$ | $R_2$ | $R_3$ |
|---|---|---|
| $CH_3$ | $CH_3$ | H |
| $CH_3$ | $CH_3CH_2$ | H |
| $CH_3$ | $CH_3CH_2CH_2$ | H |
| $CH_3$ | $CH(CH_3)_2$ | H |
| $CH_3$ | $CH_2CH{=}CH_2$ | H |
| $CH_3$ | $CH_2(CH_2)_2CH_3$ | H |
| $CH_3$ | $(CH_3)_2CHCH_2$ | $CH_2CH{=}CH_2$ |
| $CH_3$ | $CH_3$ | $CH_3$ |
| $CF_3$ | $CH_3$ | H |
| $CF_3$ | $CH_3CH_2$ | H |
| $CF_3$ | $CH_3CH_2CH_2$ | H |
| $CF_3$ | $CH_3(CH_2)_2CH_2$ | H |
| $CF_3$ | $CH(CH_3)_2$ | H |
| $CF_3$ | $CH_3$ | $CH_3$ |
| $CF_3$ | $CH_3CH_2$ | $CH_3$ |
| $CHF_2$ | $CH_3$ | H |
| $CHF_2$ | $CH_2CH{=}CH_2$ | H |
| $CHF_2$ | $CH_3$ | $CH_3$ |
| $CHF_2$ | $CH_3CH_2CH_2$ | $CH_3$ |
| $CClF_2$ | $CH_3$ | H |
| $ClCH_2$ | $CH_3CH_2CH_2$ | H |
| $ClCH_2$ | $CH_2CH{=}CH_2$ | $CH_3CH_2$ |
| $BrCH_2CH_2$ | $CH_3$ | H |
| $CF_3CF_2$ | $CH_3$ | H |
| $CF_3CF_2$ | $CH_3$ | $CH_3CH_2$ |
| $CF_3CF_2$ | $CH_3$ | $(CH_3)_2CHCH_2$ |
| $CH_3CH{=}CH$ | $CH_3$ | H |
| $CH_3CH{=}CH$ | $CH_2CH_2CH_3$ | H |
| $CH_3CH{=}CH$ | $CH_2CH{=}CH_2$ | $(CH_3)_2CH$ |
| $(CH_3)_2CHCH_2$ | $CH_3$ | H |
| $(CH_3)_2CHCH_2$ | $CH_3$ | $CH_3$ |
| $CF_3CF_2CH_2$ | $CH_3$ | H |
| $CF_3CF_2CH_2$ | $CH_3(CH_2)_2CH_2$ | $CH_3$ |
| $CF_3CF_2CF_2$ | $CH_3$ | H |
| $CF_3CF_2CF_2$ | $CH_3$ | $CH_3$ |

The preparation of exemplary metal, amine and ammonium derivatives is described herewith:

EXAMPLE 2

Potassium derivative of 1-methyl-3-(5-trifluoromethyl-1,3,4-thiadiazol-2-yl)urea To a methanolic solution of 1-methyl-3-(5-trifluoromethyl-1,3,4-thiadiazol-2-yl)urea (10 g.), a methanolic solution of potassium hydroxide (3.0 g. dissolved in 20 ml. of methanol) was added. The reaction mixture was stirred for fifteen minutes, cooled, and the potassium derivative (10 g.) filtered off. This had a melting point of 260–1° C. (decomp.) on recrystallization from a methanol/ether mixture.

Calculated for $C_5H_4F_3KN_4OS \cdot CH_3OH$ (percent): C, 23.4; H, 2.3; N, 16.2. Found (percent): C, 23.4; H, 2.2; N, 16.8.

EXAMPLE 3

Lithium derivative of 1-methyl-3-(5-trifluoromethyl-1,3,4-thiadiazol-2-yl)urea

Lithium hydroxide (0.96 g.) was added to a methanolic solution of 1-methyl-3-(5-trifluoromethyl-1,3,4-thiadiazol-2-yl)urea (9 g.) and the reaction mixture stirred for one hour at room temperature. The reaction mixture was then concentrated under vacuum to give a solid residue (8 g.) which was washed with methylene chloride. The product had a melting point of 126–130° C.

EXAMPLE 4

Potassium derivatives of 1,1-dimethyl-3-(5-trifluoromethyl-1,3,4-thiadiazol-2-yl)urea A methanolic solution of potassium hydroxide (5.4 g.) was added to a methanolic solution of 1,1-dimethyl-3-(5-trifluoromethyl-1,3,4-thiadiazol-2-yl)urea (17.9 g.). The reaction mixture was stirred for thirty minutes, concentrated to a small volume and the product (16.5 g.) filtered off. This was recrystallized from methanol/ether and had a melting point of 313–5° (decomp.).

Calculated for $C_6H_6N_4F_3KOS$ (percent): C, 25.9; H, 2.19; N, 20.1. Found (percent): C, 25.5; H, 2.15; N, 20.0.

EXAMPLE 5

Potassium derivative of 1-methyl-3-(5-pentafluoromethyl-1,3,4-thiadiazol-2-yl)urea A methanolic solution of potassium hydroxide (2.24 g.) was added to a methanolic solution of 1-methyl-3-(5-pentafluoroethyl-1,3,4-thiadiazol-2-yl)urea (11.04 g.). The reaction mixture was stirred for thirty minutes, cooled and the product (9.7 g.) filtered off and recrystallized from methanol to give a product having a melting point of 200–202° C. (decomp.).

EXAMPLE 6

Potassium derivative of 1-methyl-3-(5-methyl-1,3,4-thiadiazol-2-yl)urea

To a methanolic solution of 1-methyl-3-(5-methyl-1,3,4-thiadiazol-2-yl)urea, (3 g.), potassium hydroxide (0.89 g.) was added. The solution was stirred for thirty minutes and partially concentrated under vacuum to give the desired potassium derivative (3 g.) having a melting point of 206–10° C. (decomp.).

EXAMPLE 7

Sodium derivative of the thiadiazolylurea of Example 2

10 g. of the thiadiazolylurea of Example 2 were dissolved in 52 ml. of aqueous 2 N sodium hydroxide solution and stirred at room temperature for one hour. The solid formed was filtered off and recrystallized from methanol/ether to give 6.5 g. of the sodium derivative melting at 242–245° C. (decomp.).

Calculated for $C_5H_4F_3NaN_4OS \cdot CH_3OH$ (percent): C, 25.7; H, 2.5; N, 20.0. Found (percent): C, 24.9; H, 2.57; N, 20.36.

EXAMPLE 8

Copper derivative of 1-methyl-3-(5-trifluoromethyl-1,3,4-thiadiazol-2-yl)urea 1-methyl-3-(5-trifluoromethyl-1,3,4-thiadiazol - 2 - yl) urea (30 g.) was dissolved in methanol and to this was added cupric acetate (24 g.) dissolved in water (150 ml.). The precipitate was filtered off and washed thoroughly with water to give 30 g. of the desired product having a melting point of 256° C.

Calculated for $C_5H_4F_3N_4OS$ Cu/2 (percent): C, 23.23; H, 1.56; N, 21.8. Found (percent): C, 23.15; H, 1.61; N, 21.50.

EXAMPLE 9

Nickel derivative of 1-methyl-3-(5-trifluoromethyl-1,3,4-thiadiazol-2-yl)urea 1-methyl-3-(5-trifluoromethyl-1,3,4 - thiadiazol - 2 - yl urea potassium salt (30 g.) was dissolved in water and to this was added an aqueous solution of nickelous chloride. The resulting precipitated product was filtered off, washed thoroughly with water and dried to give 30 g. of product having a melting point of 230–4° C.

Calculated for $C_5H_4F_3N_4OS$ $Ni/2 \cdot 2H_2O$ (percent): C, 20.9; H, 2.89; N, 19.3. Found (percent): C, 20.03; H, 2.59; N, 19.5.

EXAMPLE 10

Triethylamine derivative of the thiadiazolylurea of Example 2

4.5 g. of 1-methyl-3-(5-trifluoromethyl-1,3,4-thiadiazol-2-yl)urea and 3.8 ml. of triethylamine were stirred in 10 ml. of water to give a complete solution of triethylamine derivative. The compound was not isolated, but was used in liquid form.

In similar manner, other nitrogen base derivatives were formed, such as with diethylamine, propylamine allylamine, cyclohexylamine and piperidine.

When M is an alkali metal, such as lithium, sodium, or potassium, the salts formed have the very desirable property of being highly soluble in water, possessing excellent phytocidal activity.

When M is a reactive metal of higher valence, such as chromium, manganese, iron, cobalt, zinc, aluminum, magnesium, nickel, calcium or copper, the water solubility of such derivatives may be expected to be significantly different, yet such compounds can be used effectively when compounded with adjuvants to form compositions readily dispersible in water or organic media.

Ureas will form derivatives with the alkali metals only with extreme difficulty and at relatively high cost, which largely precludes the use of such compounds in agricultural applications. Further, ureas will not form derivatives with polyvalent metals, ammonia and amines. On the other hand the compounds of the present invention are readily obtained from the parent 5 - substituted - 1,3,4-thiadiazol-2-ylurea, which makes these derivative compositions highly desirable for broad scale agricultural use. The apparent basis for the ease of formation of the derivatives of the invention resides in the tautomerism displayed by the parent compound.

The alkali metal derivatives [II] may also be reacted with compounds which have a reactive halogen to yield novel thiadiazole and thiadiazoline derivatives having the following structures, which compounds also have use in agriculture:

[A] 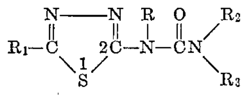

[B] 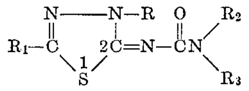

where $R_1$, $R_2$ and $R_3$ are as previously described and R is a substituent derived from compounds having a reactive halogen. The following examples illustrate preparation of derivatives [A] and [B] and indicate the nature and range of R substituents.

EXAMPLE 11

3-methyl-2-(N-methylcarbamoylimino)-5-trifluoromethyl-$\Delta^4$-1,3,4-thiadiazoline Compound [B].—An alcoholic solution of the potassium derivative (100 g.) of 1-methyl-3-(5-trifluoromethyl-1,3,4-thiadiazol-2-yl)urea and methyl iodide (57 g.) were refluxed for six hours, cooled and the insoluble salts filtered off. The alcoholic mother liquors were concentrated and the residue washed thoroughly with water. Recrystallization of solids from alcohol gave 30 g. of product having a melting point of 135–8° C.

Calculated for $C_6H_7F_3N_4OS$ (percent): C, 30.03; H, 2.94; N, 23.35. Found (percent): C, 29.72; H, 2.83; N, 23.16.

EXAMPLE 12

Compounds B and A respectively 3-cyanomethyl-2-(N - methylcarbamoylimino) - 5 - trifluoromethyl$\Delta^4$-1,3,4-thiadiazoline and 1-methyl-3-cyanomethyl-3-(5-trifluoromethyl-1,3,4-thiadiazol 2 - yl)urea.—The potassium derivative (100 g.) cited in Example 11 and chloroacetonitrile (28.5 g.) were refluxed for fifteen hours and the hot reaction mixture filtered. The mother liquors were concentrated and the residue washed with 10% sodium carbonate. Fractional crystallization from benzene gave the named isomeric products: (B) 3-cyanomethyl-2-(N-methylcarbamoylimino) - 5 trifluoromethyl-$\Delta^4$-1,3,4-thiadiazoline having a melting point of 141–143° C.

Calculated for $C_7H_6N_5F_3OS$ (percent): C, 31.72; H, 2.28; N, 26.43. Found (percent): C, 32.65; H, 2.40; N, 25.71.

(A) 1-methyl-3-cyanomethyl - 3 - (5 - trifluoromethyl-1,3,4-thiadiazol-2-yl)urea having a melting point of 117–119° C.

Calculated for $C_7H_6N_5F_3OS$ (percent): C, 31.72; H, 2.28; N, 26.4. Found (percent): C, 31.78; H, 2.35; N, 26.3.

The following lists present representative compounds within Formulae A and B above:

TABLE II.—A

| $R_1$ | $R_2$ | $R_3$ | R |
|---|---|---|---|
| $CH_3$ | $CH_3$ | H | $COOCH_3$ |
| $CHF_2$ | $CH_3$ | H | $COOCH_3$ |
| $CF_3$ | $CH_3$ | H | $CH_2OCH_3$ |
| $CF_3$ | $CH_3$ | H | $CH_2CN$ |
| $CHF_2$ | $CH_3$ | H | $CH_2CN$ |

TABLE III.—B

| $R_1$ | $R_2$ | $R_3$ | R |
|---|---|---|---|
| $C_2F_5$ | $CH_3$ | H | $CH_3$ |
| $CHF_2$ | $CH_3$ | H | $CH_3$ |
| $C_2F_5$ | $CH_3$ | H | $n.C_4H_9$ |
| $CHF_2$ | $CH_3$ | H | $n.C_4H_9$ |
| $CF_3$ | $CH_3$ | H | $n.C_4H_9$ |
| $CF_3$ | $CH_3$ | H | $CH_2=CH$ |
| $CF_3$ | $CH_3$ | H | $CH_2-CH_2OH$ |
| $CF_3$ | $CH_3$ | H | $CH_2COOCH_3$ |
| $CF_3$ | $CH_3$ | H | $CH_2CONH_2$ |
| $CF_3$ | $CH_3$ | H | $CH(CH_3)_2$ |
| $CF_3$ | $CH_3$ | H | $CH_2CF_3$ |

(2) Biological activity

As stated above, many of the novel compounds [II] of the invention have utility as phytotoxicants. Various of them may be utilized as herbicides in typical pre-emergence and/or post-emergence application to vegetation to be controlled. Others may be applied to weeds or crops for defoliation or desiccation. Selected compounds may be utilized to achieve vegetation control for a relatively short period of time or for extended periods of time in herbicidal soil-sterilant applications. The compounds may also be used in various degrees of purity ranging, for example, from pure crystals, to a technical crude grade. Suitable solvents or carrier media for these soluble metal derivatives include water, alcohols, aqueous alcohol solutions and ketones, including acetone and methyl isobutyl ketone.

When utilized for herbicidal purposes, compounds of the invention may be formulated in a variety of ways and concentrations for application to the locus of desired vegetation control. It is recognized that the particular type and concentration of formulation, as well as the mode of application of the active ingredient, may govern its biological activity in a given application.

Such compounds may be prepared as simple solutions of the active ingredient in an appropriate solvent in which it is completely soluble at the desired concentration. Such solvent systems include water, alcohols, acetone, and other organic solvents. These simple solutions may be further modified by the addition of various surfactants, emulsifying or dispersing agents, colorants, odorants, anti-foaming agents, other herbicides or herbicidal oils which suppliment or synergize the activity of the herbicides of the invention, or other adjuvants for any given application where deemed desirable to impart a particular type or degree of plant responses.

Compounds of the invention may also be formulated in various other types of compositions commonly recognized by those skilled in the art of agricultural or industrial chemicals. These formulations include, for example, compositions containing the active ingredient as granules of relatively large particle size, as powder dusts, as wettable powders, as emulsifiable concentrates, or as a constituent part of any other known type of formulation commonly utilized by those skilled in the art. Such formulations include the adjuvants and carriers normally employed for facilitating the dispersion of active ingredient for agricultural and industrial applications of phytotoxicants. These formulations may contain as little as 0.25% to more than 95% by weight of the active ingredient.

Dust formulations are prepared by mixing the active ingredient with finely divided solids which act as dispersants and carriers for the phytotoxicant in applying it to the locus of application for vegetation control. Typical solids which may be utilized in preparing dust formulations of the active ingredients of the invention include talc, kieselguhr, finely divided clay, fuller's earth, or other common organic or inorganic solids. Solids utilized in preparing dust formulations of the active ingredient normally have a particle size of 50 microns or less. The active ingredient of these dust formulations is present commonly from as little at 0.25% to as much as 30% or more by weight of the composition. Granular formulations of the active ingredients are prepared by impregnating or adsorbing the toxicant on or into relatively coarse particles of inert solids such as sand, attapulgite clay, gypsum, ground corn cobs or other inorganic or organic solids. The active ingredient of these granular formulations is commonly present from 1.0% to as much as 20% or more by weight of the composition.

Wettable powder formulations are solid compositions of matter wherein the active ingredient is absorbed or adsorbed in or on a sorptive carrier such as finely divided clay, talc, gypsum, lime, wood flour, fuller's earth, kieselguhr, or the like. These formulations preferably are made to contain 50% to 80% of the active ingredient. These wettable powder formulations commonly contain a small amount of a wetting, dispersing, or emulsifying agent to facilitate dispersion in water or other liquid carrier utilized to distribute the phytotoxicant to the locus of desired vegetation control.

Emulsifiable concentrate formulations are homogeneous liquid or paste compositions containing the active ingredient which will disperse in water or other liquid carrier to facilitate application of the phytotoxicant to the locus of desired vegetation control. Such emulsifiable concentrate formulations of the active ingredients may contain only the active ingredient with a liquid or solid emulsifying agent or may contain other relatively nonvolatile organic solvents such as isophorone, dioxane, heavy aromatic naphthas, xylene, or dimethyl formamide. The active ingredient in such formulations commonly comprises 10.0% to 70.0% by weight of the phytotoxicant composition.

EXAMPLE 13

Post-emergence herbicide activity: Greenhouse Test

The following examples serve to illustrate the post-emergence herbicidal activities of derivatives of 1-methyl-3-(5-trifluoromethyl - 1,3,4 - thiadiazol-2-yl)urea under greenhouse conditions. Seeds and/or rhizomes of a number of different plant species were planted at appropriate depths in three-inch deep planting containers and allowed to germinate and grow for approximately three weeks. At that time, solutions of the representative derivatives noted in the following Table IV were applied to plant stands at the noted treatment levels. Treated plants were held in the greenhouse along with untreated plants which served as a basis for comparison of phytotoxic responses to chemical treatments. Results presented in Table IV were recorded two weeks following chemical treatment of plants.

TABLE IV.—RESPONSES OF PLANTS TO POST EMERGENCE TREATMENTS OF METAL AND AMINE DERIVATIVES OF 1-METHYL-3-(5-TRIFLUOROMETHYL-1,3,4-THIADIAZOL-2-YL) UREA [1]

| | Derivatives | | | | | | | | | | | |
|---|---|---|---|---|---|---|---|---|---|---|---|---|
| | Sodium | | | Potassium | | | n-Propylamine | | | Allylamine | | |
| Treatment (lbs./A.) [2] | 0.125 | 0.25 | 0.5 | 0.125 | 0.25 | 0.5 | 0.125 | 0.25 | 0.5 | 0.125 | 0.25 | 0.5 |
| Test plant species: | | | | | | | | | | | | |
| Tomatoes | 5:Ne | 10:Ne | 10:Ne | 7:RNe | 9:Ne | 10:Ne | 8:RNe | 10:Ne | 10:Ne | 5:RClNe | 10:Ne | 10:Ne |
| Cucumbers | 3:Ne | 9:Ne | 10:Ne | 2:R | 7:RNe | 10:Ne | 3:Ne | 10:Ne | 10:Ne | 3:RClNe | 5:RClNe | 8:RClNe |
| Bluegrass | 4:R | 7:Ne | 9:Ne | 2:R | 7:Ne | 9:Ne | 4:R | 8:Ne | 10:Ne | 4:R | 8:Ne | 10:Ne |
| Wild oats | 9:Ne | 10:Ne | 10:Ne | 7:Ne | 9:Ne | 10:Ne | 7:Ne | 10:Ne | 10:Ne | 10:Ne | 10:Ne | 10:Ne |
| Jimsonweed | 10:Ne | 10:Ne | 10:Ne | 10:Ne | 10:Ne | 10:Ne | 10:Ne | 10:Ne | 10:Ne | 10:Ne | 10:Ne | 10:Ne |
| Velvetleaf | 5:RNe | 10:Ne | 10:Ne | 9:Ne | 9:Ne | 10:Ne | 3:ClNe | 8:Ne | 10:Ne | 6:RNe | 10:Ne | 10:Ne |
| Kochia | | | | | | | 1:Ne | 6:RNe | 10:Ne | 1:Ne | 3:NeR | 10:Ne |
| Pigweed | | | | | | | 2:Ne | 5:Ne | 10:Ne | 4:RNe | 6:RNe | 10:Ne |
| Smartweed | 7:RNe | 8:RNe | 10:Ne | 5:R | 7:RNe | 10:Ne | | | | | | |
| Johnsongrass (seeds) | 7:Ne | 7:Ne | 9:Ne | 2:R | 3:R | 9:Ne | | | | | | |
| Bindweed (rhizomes) | 5:ClNe | 6:ClNe | 5:ClNe | 5:RNe | 5:RNe | 10:Ne | 3:RClNe | 10:Ne | 8:RNe | 2:ClR | 10:Ne | 6:NeCl |
| Sugar beet | 10:Ne | 10:Ne | 10:Ne | 10:Ne | 10:Ne | 10:Ne | 9:Ne | 10:Ne | 10:Ne | 10:Ne | 10:Ne | 10:Ne |
| Clover | 10:Ne | 10:Ne | 10:Ne | 5:RNe | 10:Ne | 10:Ne | 9:Ne | 10:Ne | 10:Ne | 9:Ne | 10:Ne | 10:Ne |
| Cotton | 9:Ne | 10:Ne | 9:Ne | 8:RNe | 10:Ne | 10:Ne | 9:Ne | 10:Ne | 10:Ne | 10:Ne | 10:Ne | 10:Ne |
| Mustard | 9:N3 | 10:Ne | 10:Ne | 8:RNe | 10:Ne | 10:Ne | 10:Ne | 10:Ne | 10:Ne | 9:Ne | 10:Ne | 10:Ne |
| Crabgrass | 3:Ne | 8:Ne | 10:Ne | 5:RNe | 7:Ne | 10:Ne | 3:R | 9:Ne | 10:Ne | 3:Ne | 5:Ne | 10:Ne |
| Buckwheat | 10:Ne | 10:Ne | 10:Ne | 10:Ne | 10:Ne | 10:Ne | 10:Ne | 10:Ne | 10:Ne | 10:Ne | 10:Ne | 10:Ne |
| Morningglory | | | | | | | 5:R | 5:RNe | 10:Ne | 3:ClNeR | 7:NeR | 10:Ne |
| Peppergrass | 9:Ne | 10:Ne | 10:Ne | 10:Ne | 10:Ne | 10:Ne | 9:Ne | 10:Ne | 10:Ne | 6:NeR | 10:Ne | 10:Ne |
| Ragweed | 5:R | 5:RNe | 9:Ne | 4:R | 5:RNe | 10:Ne | 5:RCl | 5:RCl | 9:Ne | 5:R | 6:ClNe | 9:Ne |
| Chickweed | 9:Ne | 10:Ne | 10:Ne | 8:RNe | 9:Ne | 10:Ne | 9:Ne | 10:Ne | 10:Ne | 6:Ne | 10:Ne | 10:Ne |
| Lambsquarter | 10:Ne | 10:Ne | 10:Ne | 10:Ne | 10:Ne | 10:Ne | 10:Ne | 10:Ne | 10:Ne | 10:Ne | 10:Ne | 10:Ne |

| | Derivatives | | | | | | | | | | | |
|---|---|---|---|---|---|---|---|---|---|---|---|---|
| | Diethylamine | | | Triethylamine | | | Cyclohexylamine | | | Piperidine | | |
| Treatment (lbs./A.) [2] | 0.125 | 0.25 | 0.5 | 0.125 | 0.25 | 0.5 | 0.125 | 0.25 | 0.5 | 0.125 | 0.25 | 0.5 |
| Test plant species: | | | | | | | | | | | | |
| Peanut | | | | 2:RCl | 3:RCl | 10:Ne | | | | | | |
| Rice | 6:Ne | 7:Ne | 9:Ne | 4:Ne | 6:Ne | 7:Ne | | | | | | |
| Tomatoes | 10:Ne | 9:Ne | 10:Ne | 10:Ne | 10:Ne | 10:Ne | 3:Ne | 9:Ne | 10:Ne | 6:RNe | 9:Ne | 10:Ne |
| Cucumbers | 2:Ne | 10:Ne | 10:Ne | 2:Ne | 8:RNe | 10:Ne | 3:Ne | 10:Ne | 10:Ne | 3:Ne | 7:RNe | 10:Ne |
| Bluegrass | | | | | | | 3:R | 8:Re | 9:Ne | 3:R | 8:Ne | 10:Ne |
| Wild oats | 10:Ne | 10:Ne | 10:Ne | 9:Ne | 10:Ne | 10:Ne | 8:Ne | 9:Ne | 10:Ne | 9:Ne | 10:Ne | 10:Ne |
| Jimsonweed | 10:Ne | 10:Ne | 10:Ne | 10:Ne | 10:Ne | 10:Ne | 10:Ne | 10:Ne | 10:Ne | 10:Ne | 10:Ne | 10:Ne |
| Velvetleaf | 8:RClNe | 10:Ne | 10:Ne | 9=Ne | 10:Ne | 10:Ne | 6:RNe | 10:Ne | 10:Ne | 8:RNe | 10:Ne | 10:Ne |
| Smartweed | 5:RCl | 6:RClNe | 10:Ne | 3:RCl | 4:RCl | 9:Ne | 5:ClRNe | 7:RClNe | 9:Ne | 1:R | 7:RNe | 10:Ne |
| Yellow nutsedge | | | | | | | | | 5:RNe | | | 4:RNe |
| Johnsongrass (seeds) | | | | | | | 1:R | 9:Ne | 10:Ne | 0:0 | 5:RNe | 10:Ne |
| Bindweed (rhizomes) | 5:RNe | 5:RNe | 9:Ne | 5:RNe | 10:Ne | 9:Ne | | | | | | |
| Sugar beets | 9:Ne | 10:Ne | 10:Ne | 10:Ne | 10:Ne | 10:Ne | 10:Ne | 10:Ne | 10:Ne | 10:Ne | 10:Ne | 10:Ne |
| Clover | 9:Ne | 10:Ne | 10:Ne | 9:Ne | 10:Ne | 10:Ne | 10:Ne | 10:Ne | 10:Ne | 10:Ne | 10:Ne | 10:Ne |
| Cotton | 8:Ne | 10:Ne | 10:Ne | 7:Ne | 10:Ne | 10:Ne | 9:Ne | 10:Ne | 10:Ne | 8:Ne | 8:Ne | 10:Ne |
| Mustard | 9:Ne | 10:Ne | 10:Ne | 9:Ne | 10:Ne | 10:Ne | 10:Ne | 10:Ne | 10:Ne | 10:Ne | 10:Ne | 10:Ne |
| Yellow foxtail | 6:RNe | 7:RNe | 9:Ne | 7:Ne | 7:Ne | 9:Ne | 6:Ne | 9:Ne | 9:Ne | 7:RNe | 9:Ne | 9:Ne |
| Barnyardgrass | 3:RNe | 8:RNe | 10:Ne | 3:Ne | 7:Ne | 9:Ne | | | | | | |
| Crabgrass | 6:RNe | 7:RNe | 10:Ne | 6:Ne | 9:Ne | 10:Ne | 1:Ne | 7:Ne | 10:Ne | 7:Ne | 8:Ne | 9:Ne |
| Buckwheat | 10:Ne | 10:Ne | 10:Ne | 10:Ne | 10:Ne | 10:Ne | 9:Ne | 10:Ne | 10:Ne | 10:Ne | 10:Ne | 10:Ne |
| Peppergrass | 8:ClNe | 10:Ne | 10:Ne | 8:Ne | 10:Ne | 10:Ne | 8:Ne | 10:Ne | 10:Ne | 8:Ne | 10:Ne | 10:Ne |
| Ragweed | 5:R | 6:R | 9:Ne | 5:R | 5:RN | 10:Ne | | | | | | |
| Chickweed | 9:Ne | 10:Ne | 10:Ne | 9:Ne | 10:Ne | 10:Ne | 10:Ne | 9:Ne | 10:Ne | 9:Ne | 9:Ne | 10:Ne |
| Lambsquarter | 10:Ne | 10:Ne | 10:Ne | 10:Ne | 10:Ne | 10:Ne | 10:Ne | 10:Ne | 10:Ne | 10:Ne | 10:Ne | 10:Ne |

[1] Legend: Injury ratings are defined as a numerical rating of plant injury and a description of the type of plant responses noted—0=No effect; 1-3=Slight plant injury; 4-6=Moderate plant injury; 7-9= severe plant injury; 10=Total kill of plants; Ne=Necrosis; Cl=Chlorosis; O=No Effect; R=Retarded or reduced growth.

[2] Expressed as thiadiazol-2-ylurea equivalent.

The above test data denote the herbicidal activity of the above noted compositions.

EXAMPLE 14

General herbicide activity: Field Test

Test plots were marked out in a field containing native stands of goldenrod, Canadian thistle, dandelion, clover, broad-leaved plantain and Russian tumbleweed. The potassium and triethylamine derivatives of 1-methyl-3-(5-trifluoromethyl-1,3,4-thiadiazol-2-yl)urea were prepared as aqueous solutions and as aqueous solutions containing 0.5 percent by volume of "Tronic" (a commercial surfactant preparation). These solutions were applied to test plots at rates noted in Table V in a spray volume equivalent to 100 gallons of spray per acre. Comparable untreated test plots were maintained to provide a comparison of plant responses obtained in treated plots. Phytotoxic responses of plants to chemical treatment were observed over a period of six and one-half weeks following application of chemical treatments. During this period of time, additional plants of the noted species continued to emerge and subsequently die as a result of soil residual persistence of the chemicals. In addition, emergence of other plant species (mare's tail, ragweed, white top daisy, wood sorrel, and cheat grass) not initially present in the test plots occurred during this period. Since some plants of a given species would emerge and persist in the treated test plots for a period of time in various stages of plant injury prior to subsequent resultant death, plant injury ratings as noted in Table V are a composite rating of all plants of that species occurring in the test plot at the given time periods.

TABLE V.—HERBICIDAL RESPONSES OF PLANTS TO DERIVATIVES OF 1-METHYL-3-(5-TRIFLUOROMETHYL-1,3,4-THIADIAZOL-2-YL)UREA[1]

| Derivative | Potassium | | | | | | Triethylamine | | | | | |
|---|---|---|---|---|---|---|---|---|---|---|---|---|
| Carrier | Water | | | Water plus tronic | | | Water | | | Water plus tronic | | |
| Treatment[2] | 4.4 lbs./a. | | | | | | 5.0 lbs./a. | | | | | |
| Time (weeks) | 1 | 2 | 6.5 | 1 | 2 | 6.5 | 1 | 2 | 6.5 | 1 | 2 | 6.5 |
| Plant species: | | | | | | | | | | | | |
| Goldenrod | 7 | 9 | 9 | 9 | 9+ | 9+ | 7 | 9+ | 9+ | 9 | 9+ | 5 |
| Canadian thistle | 9 | 7 | 7 | 7 | 5 | 7 | 7 | 5 | 6 | 7 | 5 | 4 |
| Dandelion | 7 | 9 | 5 | 8 | 9 | 5 | 4 | 8 | 4 | 8 | 9 | 6 |
| Clover | 8 | 9+ | 9 | 9 | 9+ | 8 | 8 | 10 | 10 | 9+ | 9+ | 10 |
| Broadleaved plantain | 4 | 9 | 9+ | 9 | 9+ | 9 | 9 | 10 | 9+ | ----- | 5 | 9 |
| Russian tumbleweed | 8 | 9 | 9 | 8 | 9 | 9+ | 7 | 9+ | 8 | 7 | 9+ | 9 |
| Mare's tail | ----- | ----- | 8 | ----- | ----- | 9+ | ----- | 8 | 8 | ----- | ----- | 9 |
| Ragweed | ----- | ----- | 10 | ----- | ----- | 10 | ----- | 10 | 10 | ----- | ----- | 10 |
| Whitetop daisy | ----- | ----- | 10 | ----- | ----- | 10 | ----- | 10 | 10 | ----- | ----- | 10 |
| Wood sorrel | ----- | ----- | 10 | ----- | ----- | 11 | ----- | 10 | 10 | ----- | ----- | 10 |
| Cheat grass | ----- | ----- | 10 | ----- | ----- | 10 | ----- | 10 | 10 | ----- | ----- | 10 |

[1] Injury scale: 0=No effect; 1–3=Slight plant injury; 4–6=Moderate plant injury; 7–9=Severe plant injury; 10=Total kill of plants.
[2] Expressed as thiadiazol-2-ylurea equivalents.

Results of the above test denote both the foliar herbicidal efficacy as well as the herbicidal soil residual (pre-emergence herbicidal efficacy) properties of the subject chemicals. Test results also reveal that initial post-emergence herbicidal activity of subject chemicals is enhanced by inclusion of a surface active agent in the spray solution.

EXAMPLE 15

General herbicide activity: Field Test

Test plots were marked out in a field in a manner similar to that noted in the previous example. The potassium and sodium derivatives of 1-methyl-3-(5-trifluoromethyl-1,3,4-thiadiazol-2-yl)urea were prepared as aqueous solutions and as aqueous solutions containing 0.5 percent by volume of various surfactants noted in Table VI. Treatments were made as foliar applications in a spray volume equivalent to 100 gallons of spray per acre. Phytotoxic responses of plants to chemical treatments were assessed as noted in Example 14. Results are presented in Table VI.

TABLE VI.—HERBICIDAL RESPONSES OF PLANTS TO POTASSIUM AND SODIUM DERIVATIVES OF 1-METHYL-3-(5-TRIFLUOROMETHYL-1,3,4-THIADIAZOL-2-YL)UREA[1]

[Treatment: 5.0 lbs./a.[2]]

| Derivative | Spray Carrier | Clover | | Ragweed | | Dandelion | | Wild carrot | |
|---|---|---|---|---|---|---|---|---|---|
| | | 2 days | 25 days | 2 days | 25 days | 2 days | 25 days | 2 days | 25 days |
| Potassium | Water | 4 | 8 | 2 | 10 | 2 | 4 | 2 | 9 |
| Do | Water plus tronic | 7 | 10 | 8 | 10 | 4 | 5 | 4 | 10 |
| Do | Water plus colloidal Z-1 | 7 | 10 | 8 | 10 | 7 | 6 | 5 | 9+ |
| Do | Water plus tween 20 | 7 | 9 | 4 | 10 | 7 | 7 | 3 | 10 |
| Do | Water plus colloidal X-77 | 7 | 10 | 8 | 10 | 5 | 5 | 4 | 10 |
| Do | Water plus Maran F | 5 | 9 | 4 | 10 | 1 | 4 | 3 | 8 |
| Do | Water plus span 20 | 5 | 10 | 8 | 10 | 8 | 6 | 4 | 10 |
| Sodium | Water | 1 | 10 | 2 | 10 | 0 | 5 | 1 | 9 |
| Do | Water plus tronic | 7 | 10 | 6 | 10 | 3 | 5 | 5 | 10 |

[1] For legend, see key to Table V.
[2] Expressed as thiadiazol-2-ylurea equivalents.

The above tests results indicate the herbicidal efficacy of the subject compounds of the invention. The initial activity of both compounds is enhanced by addition of various surfactants to the spray solution, with different surfactants promoting a more definite enhancement of herbicidal activity against given plant species.

EXAMPLE 16

Pre-emergence herbicide activity: Green house Tests on copper and nickel derivatives The pre-emergence hebicidal activities of the copper and nickel derivatives of 1 - methyl - 3 - (5 - trifluoromethyl - 1,3,4 - thiadiazol - 2 - yl)urea were demonstrated under greenhouse conditions. Seeds of sixteen plant species were planted at appropriate depths in three-inch deep planting containers. Both chemicals were applied to the soil surface in the planting containers within one day of seeding in the for mof five percent dust formulations. Three weeks following chemical applications phytotoxic responses of plants to chemical treatments were assessed. Results of these tests are presented in Table VII and reaveal polyvalent metal derivative to be highly active as herbicides.

TABLE VII.—RESPONSES OF PLANTS TO PRE-EMERGENCE TREATMENTS OF 1-METHYL-3-(5-TRIFLUOROMETHYL-1,3,4-THIADIAZOL-2YL) UREAP OLYVALENT METAL DERIVATIVES

| | Derivatives | | | | | | | |
|---|---|---|---|---|---|---|---|---|
| | Copper | | | | Nickel | | | |
| | Treatment level (lbs./acre) [1] | | | | | | | |
| | 0.5 | 1.0 | 2.0 | 4.0 | 0.5 | 1.0 | 2.0 | 4.0 |
| Test plants: | | | | | | | | |
| Mustard | 7:Ne | 10:Ne | 10:Ne | 10:Ne | 9:NeR | 9:NeR | 10:Ne | 10:Ne |
| Alfalfa | 1:R | 4:RC1 | 9:C1Ne | 10:Ne | 9:NeC1 | 9:C1Ne | 9:C1Ne | 10:Ne |
| Flax | 5:NeC1 | 10:Ne | 10:Ne | 9:C1Ne | 10:Ne | 9:C1Ne | 10:Ne | 10:Ne |
| Cucumber | 9:NeC1 | 10:Ne | 10:Ne | 10:Ne | 10:Ne | 10:Ne | 10:Ne | 10:Ne |
| Oats | 7:R | 10:Ne | 10:Ne | 10:Ne | 10:Ne | 10:Ne | 10:Ne | 10:Ne |
| Safflower | 0:0 | 5:RC1 | 9:C1Ne | 7:C1R | 1:C1 | 4:C1R | 10:Ne | 10:Ne |
| Milo | 1:R | 9:C1Ne | 10:Ne | 9:C1Ne | 7:C1R | 9:C1R | 10:Ne | 10:Ne |
| Peas | 6:Ne | 9:Ne | 10:Ne | 10:Ne | 9:C1Ne | 9:C1Ne | 9:C1Ne | 10:Ne |
| Tomato | 9:C1R | 9:C1Ne | 9:C1Ne | 10:Ne | 9:C1R | 9:C1Ne | 10:Ne | 10:Ne |
| Corn | 0:0 | 5:RC1 | 7:C1R | 9:C1Ne | 5:R | 7:C1R | 10:Ne | 10:Ne |
| Wild Oats | 9:Ne | 9:Ne | 10:Ne | 10:Ne | 9:C1R | 10:Ne | 10:Ne | 10:Ne |
| Carrots | 4:Ne | 10:Ne | 10:Ne | 10:Ne | 9:C1R | 10:Ne | 10:Ne | 10:Ne |
| Bush Beans | 9:C1R | 10:Ne | 9:NeC1 | 10:Ne | 9:NeC1 | 10:Ne | 10:Ne | 10:Ne |
| Onion | 1:R | 9:NeC1 | 9:NeC1 | 10:Ne | 6:C1R | 10:Ne | 10:Ne | 10:Ne |
| Rape | 10:Ne | 10:Ne | 10:Ne | 10:Ne | 7:Ne | 10:Ne | 10:Ne | 10:Ne |
| Cabbage | 9:NeC1 | 9:NeC1 | 10:Ne | 10:Ne | 0:0 | 9:NeR | 10:Ne | 10:Ne |

[1] Expressed as thiadiazol-2-ylurea equivalents.

NOTE: For legend, see footnotes at bottom of Table IV.

From a consideration of all the foregoing as to the synthesis of novel phytotoxicant chemicals and their use alone or in combination with other useful components to produce effective vegetation control, it is evident that each of the initially recited objects of the present invention has been achieved.

Many modifications of the basic concepts of the invention here presented will be evident to those skilled in the art. Such modifications are properly to be included within the scope of the invention which is in no way to be restricted by the various illustrative data hereinbefore contained but only by the appended claims.

What is claimed is:

1. A compound having the structure:

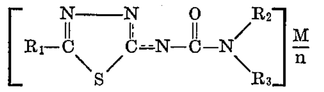

wherein $R_1$ is a substituent selected from the group consisting of $C_2$–$C_4$ alkenyl radicals, $C_1$–$C_4$ alkyl radicals and halogenated derivatives of said radicals, wherein each halogen is independently selected from the group consisting of fluorine, chlorine and bromine; $R_2$ is a $C_2$–$C_4$ alkenyl radical, or a $C_1$–$C_4$ alkyl radical; $R_3$ is a substituent selected from the group consisting of hydrogen, $C_2$–$C_4$ alkenyl radicals and $C_1$–$C_4$ alkyl radicals; M is derived from the group consisting of ammonia, triethylamine, propylamine, allylamine, cyclohexylamine and piperidine, metals selected from the group consisting of sodium, potassium, lithium, calcium, magnesium, chromium, manganese, iron, cobalt, nickel, copper, zinc and aluminum and *n* is an integer corresponding the equivalence of M.

2. A compound as in claim 1 wherein $R_1$ is alkyl or fluoroalkyl.

3. A water-soluble compound of claim 2 wherein M is a sodium, potassium or lithium.

4. A compound of claim 2 wherein M is calcium, magnesium, chromium, manganese, iron, cobalt, nickel, copper, zinc or aluminum.

5. A compound of claim 2 wherein M is derived from ammonia, triethylamine, propylamine, allylamine, cyclohexylamine or piperidine.

6. A compound as in claim 3 wherein, further, $R_1$ is trifluoromethyl, $R_2$ is methyl and $R_3$ is hydrogen.

7. A compound as in claim 3 wherein, further, $R_1$ is trifluoromethyl and $R_2$ and $R_3$ are each methyl.

8. A compound as in claim 3, wherein, further, $R_1$ is pentafluoroethyl, $R_2$ is methyl and $R_3$ is hydrogen.

9. A compound as in claim 3, wherein, further, $R_1$ is difluoromethyl, $R_2$ is methyl and $R_3$ is hydrogen.

References Cited

UNITED STATES PATENTS 2,413,917 1/1947 Harman ........ 260—306.6

NICHOLAS S. RIZZO, Primary Examiner

R. J. GALLAGHER, Assistant Examiner

U.S. Cl. X.R.

71—90; 260—299, 306.7, 306.8